United States Patent [19]

Phelps et al.

[11] Patent Number: 4,767,592

[45] Date of Patent: Aug. 30, 1988

[54] PROTECTIVE INTERIOR WALL AND ATTACH8ING MEANS FOR A FUSION REACTOR VACUUM VESSEL

[75] Inventors: Richard D. Phelps, Greeley, Colo.; Gerald A. Upham, Valley Center; Paul M. Anderson, San Diego, both of Calif.

[73] Assignee: The United States of America as represented by the United States Department of Energy, Washington, D.C.

[21] Appl. No.: 707,359

[22] Filed: Mar. 1, 1985

[51] Int. Cl.$^4$ .................................................. G21B 1/00
[52] U.S. Cl. ..................................... 376/150; 376/287; 52/543; 52/509
[58] Field of Search ........ 376/150, 287, 288, 302–304, 376/285, 286; 52/224, 248, 249, 245, 509, 506, 410, 543, 546; 24/457, 458; 411/81, 83, 103, 929.2

[56] References Cited

U.S. PATENT DOCUMENTS

| | | | |
|---|---|---|---|
| 3,173,178 | 3/1965 | Kumburis | 52/509 |
| 3,881,288 | 5/1975 | Fay | 52/224 |
| 4,285,182 | 8/1981 | Dinges | 52/543 |

Primary Examiner—Frederick R. Schmidt
Assistant Examiner—Bradley I. Vaught
Attorney, Agent, or Firm—L. E. Carnahan; Roger S. Gaither; Judson R. Hightower

[57] ABSTRACT

An array of connected plates mounted on the inside wall of the vacuum vessel of a magnetic confinement reactor in order to provide a protective surface for energy deposition inside the vessel. All fasteners are concealed and protected beneath the plates, while the plates themselves share common mounting points. The entire array is installed with torqued nuts on threaded studs; provision also exists for thermal expansion by mounting each plate with two of its four mounts captured in an oversize grooved spool. A spool-washer mounting hardware allows one edge of a protective plate to be torqued while the other side remains loose, by simply inverting the spool-washer hardware.

20 Claims, 6 Drawing Sheets

PROTECTIVE INTERIOR WALL AND ATTACH8ING MEANS FOR A FUSION REACTOR VACUUM VESSEL

BACKGROUND OF THE INVENTION

The invention described herein arose in the course of, or under, Contract No. DE-AT03-76ET51011 awarded by the U.S. Department of Energy.

This invention relates to protective wall surfaces for vessels, particularly to such wall surfaces for magnetic confinement reactors, and more particularly to a protective interior wall for fusion reactor vacuum vessels and fastener means therefor.

Substantial effort has been and is being directed toward the development of magnetic confinement fusion reactors. Various types of fusion reactor systems are currently under development, which include types generally known as tokamaks, magnetic mirrors, etc. Among the tokamaks type fusion reactors being developed is the Doublet III (D-III). One of the problems associated with the development of these reactors is how to protect the inner walls of the vacuum vessel. Various efforts have been directed to providing protective first wall designs which enable safe operation of the reactor.

In a previous protective wall arrangement proposed for divertor type tokamaks, such as the Doublet III magnetic confinement fusion system, the vacuum vessel inside wall was protected by uncooled, vertically mounted bars formed of one-half cylinders (as if cut vertically) of Inconel X750 spaced about 10 in (25 cm) apart toroidally. This protection arrangement was based on the fact that the field lines intersect the wall at nearly grazing incidence so that a finite number of bars (half-cylinders) provide protection by shadowing. The minimum pitch of the field lines (8:1) is the ratio of the strong toroidal magnetic field to the radial magnetic field produced by external field shaping coils (external of the vacuum vessel).

During recent in-vessel inspection, it was found that the Inconel protective bars had melted substantially. Because of the small radius of the half-cylinder Inconel bars, the plasma heat flow struck the bars at nearly normal incidence in an area about 0.8 in. (2.03 cm) wide and 3 in (8 cm) high. Thermocouple, infrared camera, and Langmuir probe data showed power loadings on these hot spots to be between 1.0 and 1.7 kW/cm$^2$ with 3.5MW of neutral beam power. Such power loadings will melt Inconel X750.

Since it was planned to increase the neutral beam power to 7.5MW and to double the pulse length to 0.5 sec, a new approach had to be devised to lower the power per unit area on the divertor wall protection system. One approach was to enlarge the vertical distance of plasma-wall interaction by different programming of the external field shaping coils. Another approach was to increase the toroidal length of the plasma-wall interaction, which for a continuous toroidal belt limiter could be 245 in. (612 cm) on the inside wall. In comparison the Inconel bars gave a toroidal interaction length of only 13 in. (32 cm).

Thus, a need existed for a protective first wall of a reactor vacuum vessel which enables safe operation of diverter discharges with high neutral beam power.

Therefore, it is an object of this invention to provide an improved protective wall for the vacuum vessel of a reactor.

A further object of the invention is to provide such a protective wall which utilizes a series of small rectangular plates.

Another object of the invention is to provide such a protective wall which effectively conceals and protects all mounting hardware beneath the plate array.

Another object of the invention is to provide an array of connected plates on the interior wall of a vacuum vessel to form a protective surface for energy deposition inside the vessel, wherein the fasteners provide for thermal expansion.

Another object of the invention is to provide a protective wall for a vacuum vessel which consists of an array of plates and utilizes fastening means which capture mounting members of the plates in grooved spools.

Another object of the invention is to provide a mounting means for an array of connected plates forming a protective wall of a vacuum vessel which allows for thermal expansion and allows one edge of a protective plate to be torqued while the other side remains loose.

Other objects of the invention will become apparent from the following description and accompanying drawings to those skilled in the art.

SUMMARY OF THE INVENTION

The objects of the invention are carried by providing a protective inner wall for vacuum vessels, particularly for tokamak type fusion reactors. The wall basically consists of an array of small rectangular plates attached to the existing walls with threaded fasteners. The protective wall effectively conceals and protects all mounting hardware beneath the plate array, while providing a substantial surface area that will absorb plasma energy.

More specifically, an array of connected plates are mounted on the inner walls of the vacuum vessel, such as the Doublet III fusion reactor. The plates share common mounting points and are installed with torqued nuts on threaded studs. Provision is made for thermal expansion by mounting each plate with two of its four mounts captured in an oversize grooved spool. The spool-washer mounting hardware allows one edge of a plate to be torqued while the other side remains loose, this being accomplished by simply inverting the spool-washer hardware (see FIG. 5b.) The plates, in addition to having four mounting points or members, include a pair of bent or curved side sections which function to cover and conceal the mounting hardware. The mounting hardware includes a standoff to space the plates from the inner wall of the vessel, a spool and a clamping washer which are mounted on a bolt or stud welded to the vessel inner wall.

DETAILED DESCRIPTION OF THE INVENTION

The invention involves a protective surface or wall for energy deposition inside a vacuum vessel, such as used in a tokamak type reactor system exemplified by the Doublet III magnetic confinement fusion reactor. The protective surface or wall involves at least one array of connected plates mounted on the inside walls of the vessel. The protective surface utilizes an array of small rectangular plates attached with threaded fasteners to the existing walls. The protective surface enables safe operation of divertor discharges with high neutral beam power.

Figure 1:
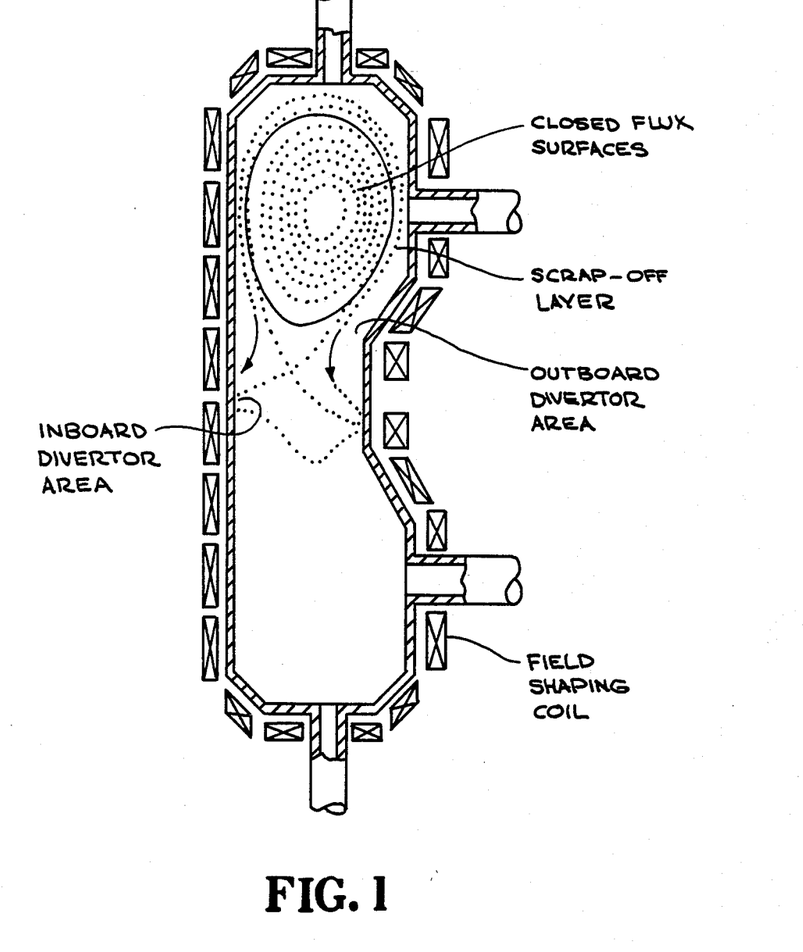
FIG. 1 illustrates an expanded boundary divertor configuration in the Doublet III magnetic confinement fusion reactor.

Divertor plasma operation in the Doublet III, for example, is substantially different from the operation of classical divertor tokamak type reactor systems, such as Poloidal Divertor Experiment (PDX) and Axisymmetric Divertor Experiment (ASDEX). In those devices, plasma energy flow is guided to a sacrificial neutralizer plate by coils inside the vacuum vessel. In the Doublet III type system there are no coils inside the vacuum vessel; the plasma energy is guided by the external coils to the vessel wall itself. The flux surface geometry for the expanded boundary diverter mode of the Doublet III type system is shown in FIG. 1.

The power flow in the expanded boundary divertor mode is as follows: Ohmic and neutral beam power (up to about 5MW to date) is deposited inside the closed flux surfaces (see FIG. 1). Typically about one-third of this power is radiated by impurities uniformly and harmlessly to the walls of the vacuum vessel. The remaining two-thirds of this power flows radially across the closed flux surfaces into the scrape-off layer.

The scrape-off layer (see FIG. 1) is about 0.60 in. (2 cm) thick and consists of those field lines which are not closed but run to the divertor areas on the wall. The heat transport in the scrape-off layer is mainly parallel to the field lines. Because of high plasma density buildup just in front of the divertor areas, much of the power is radiated from this divertor region or area before it impinges on the wall.

The wall protection system of this invention is made up of discrete uncooled Inconel plates but offers about 86% of the toroidal coverage of the prior known continuous belt limiter. Future power loadings should be down from the previous 1.0 to 1.7 kW/cm$^2$ by a factor of 16 (245X0.86/13). Since the projected energy load will increase four times, a net reduction of a factor of 4 in power loading should be realized.

The plate array wall protection system of this invention, as opposed to the prior continuous belt limiter, has no continuous toroidal current path which would carry large currents during disruptions and plasma breakdown. The small plates minimize forces and torques produced by eddy currents induced during normal plasma operation and disruptions. Since the system is uncooled, relying primarily on radiative cooling between shots, thermal cycling and stress and provision for thermal expansion were important factors in the design of the plate array system.

The protective wall system also requires that inherent material strength be sufficient to resist applied loads, and that the cross-sectional area at attachment points be large enough to ensure proper electrical grounding and physical anchoring of each plate. Other goals accomplished by the protective wall of this invention are to: Minimize the quantity of different kinds of plates; minimize the number of new studs required for attaching the plates to the walls; and reduce the amount of welding, machining, and bending needed to fabricate the plates. In addition, the plate array system interfaces with existing diagnostics and is easy to install, while distortion effects due to thermal expansion are minimal.

Figure 2:
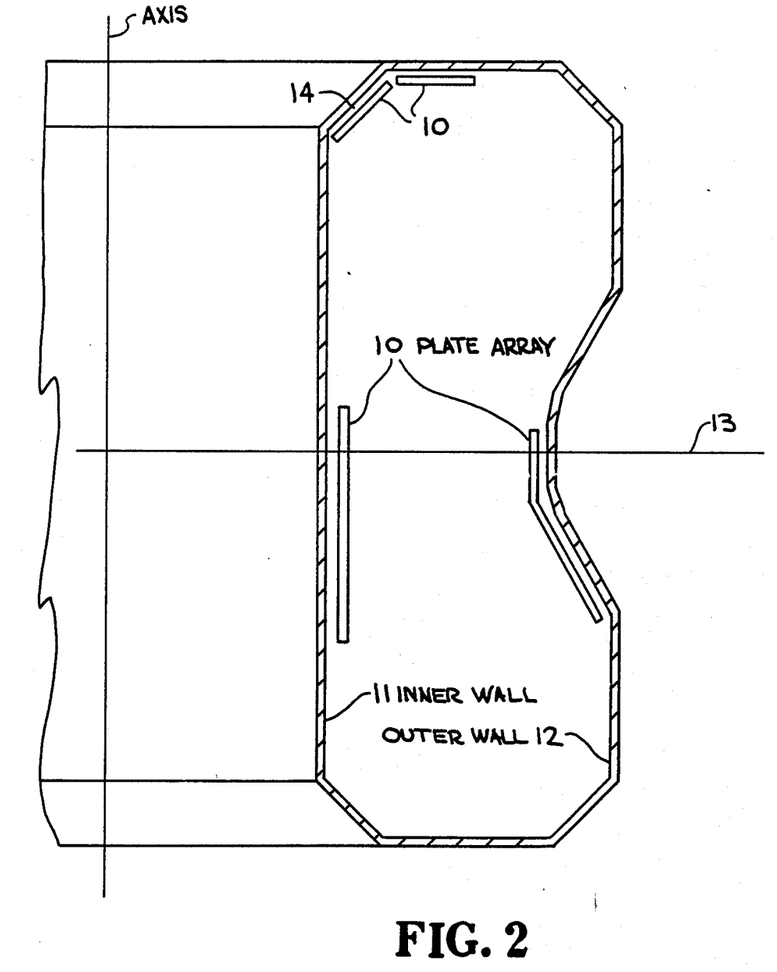
FIG. 2 illustrates the desired protective plate areas inside the vacuum vessel of the Doublet III.

The primary areas of the inside surface of the pressure vessel walls to be protected by the protective plate arrays or heat shields, indicated generally at 10, are illustrated in FIG. 2. These areas are all potential areas of impingement by diverted field lines, depending on the exact configuration of the flexible plasma field shaping coil system of the reactor (Doublet III in this embodiment). For example, the expanded boundary divertor of FIG. 1 may be operated such that it produces heat loads on both the inboard (inner) and outboard (outer) walls indicated at 11 and 12, respectively, at or below the midplane 13, as shown in FIG. 2, or the divertor configuration may be operated such that heat loads are produced only on the inboard (inner) wall 11 at two sites, above and below midplane 13. Also, when the expanded boundary diverter is operated with highly triangular plasmas, such produce diverted field line impingement in an upper inner corner of the vacuum vessel, indicated at 14, as shown in FIG. 2.

Figure 3:
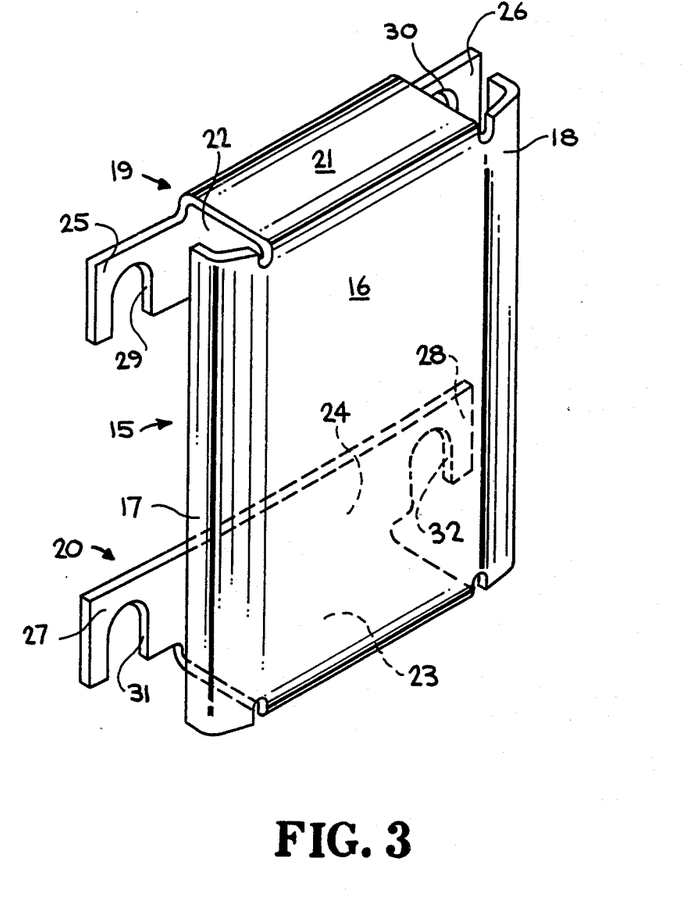
FIG. 3 illustrates a protective plate made in accordance with the present invention.
Figure 5A:
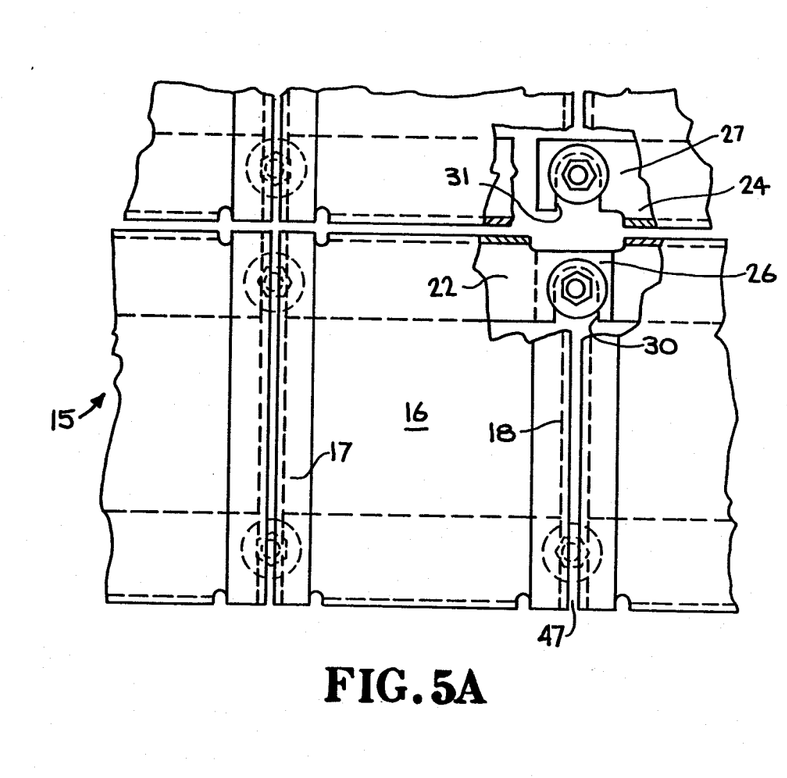
FIGS. 5a, 5b and 5c illustrate the front, top and side views of an installation of a protective plate array in accordance with the present invention.
Figure 5B:
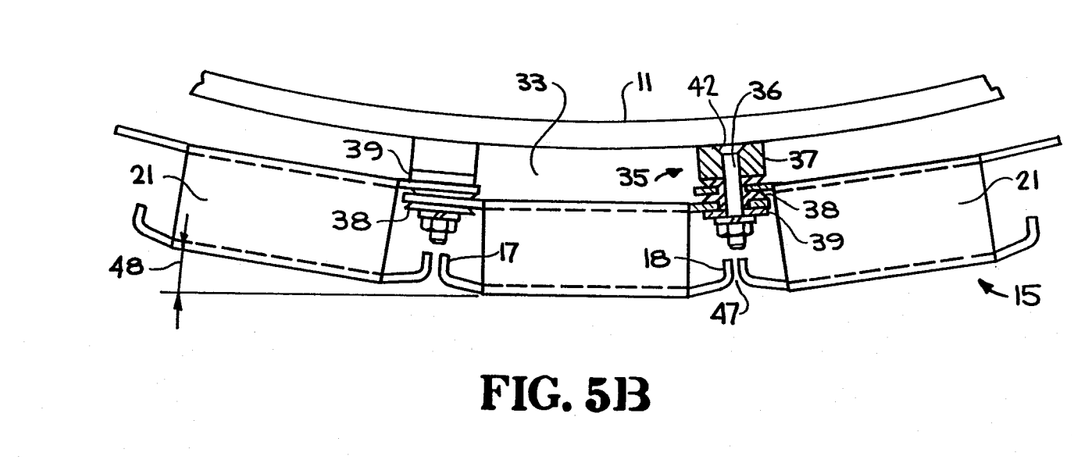
Figure 5C:
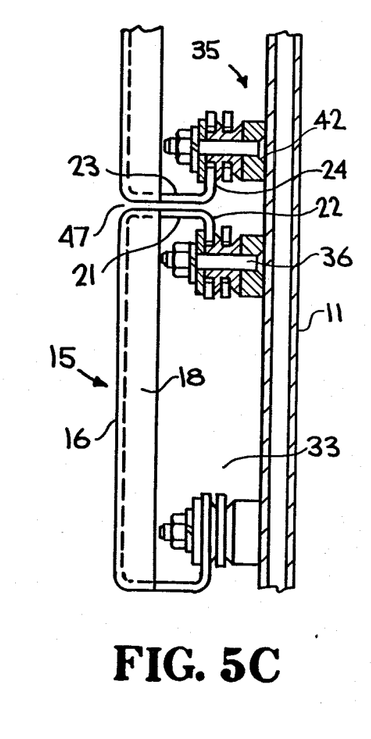

The divertor heat shield or protective wall of this invention consists of an array of rectangular shaped plates, generally indicated at 15, as shown in FIGS. 5a–5c. Each plate 15, as shown in FIG. 3 may, for example, be 8×6 in. (20×15 cm) fabricated from ⅛ in. thick Inconel 625 sheet. The basic plate design is a folded 'mailbox' configuration, which allows an external face or main body surface or section 16 of the plate to protect both the vessel wall and the hardware which attaches the plates to the wall, as seen in FIGS. 5a–5c. As seen in FIG. 3 edge portions along the longer side of plate 15, indicated at 17 and 18 of the plate face or surface 16 are each bent downward at two places to obtain greater rigidity and to minimize bending and distortion of the plates due to uneven heating and thermal expansion. Note that the outer ends of edge portions 17 and 18 are bent so as to be substantially perpendicular with respect to the main body portion of surface 16. The plate 15 includes two end flange-like portions 19 and 20 which are each bent at two points at an angle of about 90° with respect to the main body portion of surface 16, and form surfaces 21, 22 and 23, 24, respectively. Each of the surfaces 22 and 24 of flange-like portions 19 and 20 is provided with a pair of protuding sections or attachment members 25, 26 and 27, 28, respectively, which include cut-aways 29, 30, 31 and 32 respectively, by which the plate 15 is mounted to the vessel wall 11 or 12, as described hereinafter. Note that surfaces 22 and 24 of flange portions 19 and 20 are bent in a direction toward each other, with the cut-aways 29–32 being located in the lower side or end of each of protuding sections 25–28.

By way of example, the edge portions have a width of 0.75 in.; flange-like portions 19 and 20 have a width of 2.07 in. and length of 7.38 in., with surfaces 21 and 23 having a width of 4.25 in. and surfaces 22 and 24 having a width of 2.0 in.; protuding sections 25–28 having a length of 1.56 in. and width of 2.0 in., with cut-aways 29–32 having a depth of 1.0 in. and width of 0.75 in.

An array 10 of protective plates 15 covers the selected areas of the vessel walls 11 and/or 12 and the void volume, indicated at 33, between the plates and the wall is an area where neutral particles can accumulate. To prevent these neutral particles from influencing the plasma as they move upward beyond the plate array 10, the top course or section of plates 15 on both inner and outer walls 11 and 12 are fitted with a series of gas-seal sheets or plates (not shown) which extend across the adjacent edges 17 and 18 of the adjacent plates 15. This series of gas-seal sheets or plates effectively blocks particle migration out of the top of the plate array 10.

The protective plates 15 are mounted on the inner walls 11 and 12 of the vacuum vessel by fasteners or mounting hardware assemblies or structure illustrated in FIGS. 4 and 5a-5c. The fasteners, or mounting hardware assemblies, generally indicated at 35, each consist of a stud 36, a centrally apertured standoff 37, a centrally apertured spool 38, clamping washer 39, lock washer 40 and nut 41. The central aperture of standoff 37 includes a tapered section 42. The studs 36 are welded to the vessel wall 11, as indicated at 43, and are, for example, 0.312 in. (0.79 cm) diameter Inconel, with a length of 1.50 in. The spool 38 is provided with an outer annular groove 44 having an outer tapered edge 45, and with a reduced diameter projecting section 46.

Figure 4:
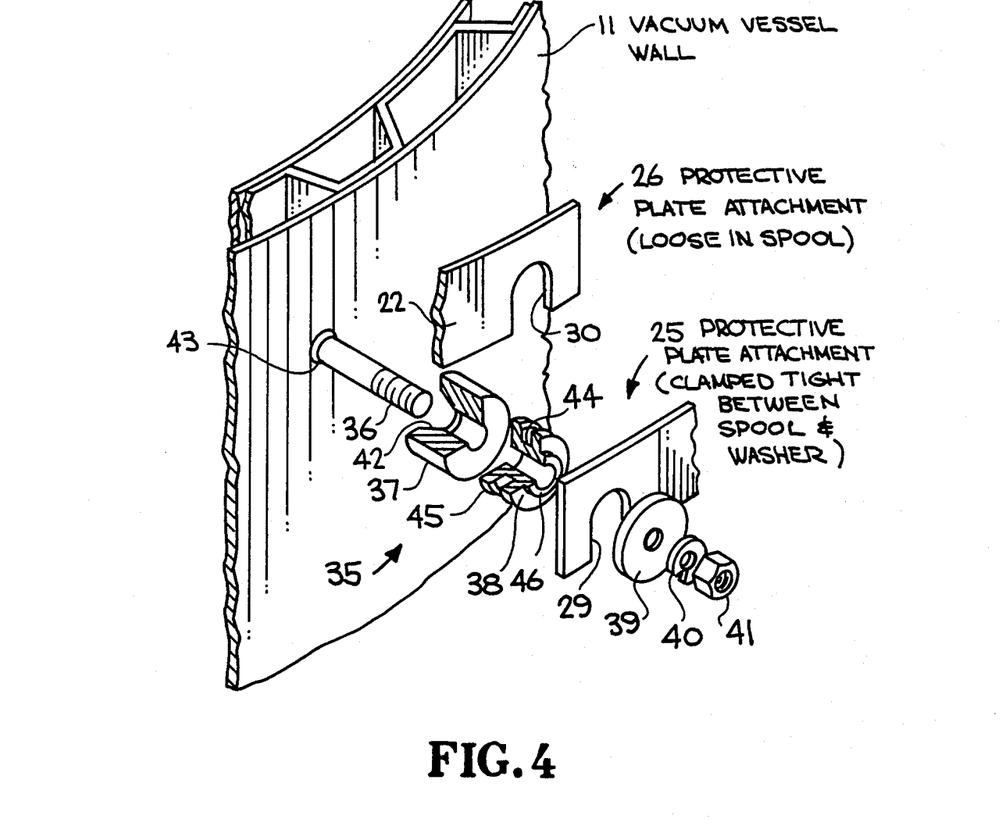
FIG. 4 illustrates the mounting hardware for the protective plates in accordance with the invention.

For example, the standoff 37 is fabricated of stainless steel, with a diameter of 1.25 in. and length of 0.675 in. with the tapered central aperture 42 at an angle of 45°; the spool 38 is fabricated of silver plated stainless steel, with an overall length of 0.50 in., an outer diameter of 1.25 in., with groove 44 having a depth of 0.315 in., width of 0.15 in., with tapered edge 45 being at an angle of 30°, and with projecting section 46 having a length of 0.10 in. and diameter of 0.62 in. The clamping washer 39 is fabricated of silver plated stainless steel with an outer diameter of 1.25 in. and thickness of 0.125 in. with lock washer 40 and nut 41 being fabricated of silver plated stainles steel.

Each plate 15 is anchored by four studs 36, with the tapered central opening 42 of standoff 37 extending around the weld 43, as shown in FIGS. 5b and 5c. Two tight, electrically sound anchors are made on one side of each plate, as illustrated in FIG. 4 by plate attachment member 25 being clamped tight between spool 38 and clamping washer 39, projecting section 46 of spool 38 serving as a support and abutment point with cut-away 29 of attachment member 25. This complete electrical circuit from plate 15 through stud 36 to wall 11 does not intercept poloidal magnetic flux and so no major disruption-caused current should flow in the plate 15 or studs 36. The two remaining studs 36 are designed as slip joints (poor electrical contact), as illustrated in FIG. 4 by plate attachment member 26 being loose in groove 44 of spool 38, with cut-away 30 being supported by spool 38. These slip joints restrain normal loading, are easy to assemble, and accommodate thermal expansion.

Plates 15 will not be overstressed if the slip joint (spool groove 44 and attachment member 26) cannot slip due to friction or misalignment. The spool 38 accommodates thermal expansion. The spool 38 can be installed with projecting section 46 facing outwardly or inwardly. Either way, it allows one plate to be tightened (via clamping washer 39) while the neighboring plate, attached at the same point, slides in oversized groove 44 of spool 38, as shown in FIG. 5b. A space, indicated at 47, between plates 15 is held to a nominal 0.18 in. (0.46 cm), see FIG. 5a-5c. Also, as shown at 48 in FIG. 5b, the surfaces 16 of adjacent plates 15 are at an angle of 7.0° (8:1 pitch line) with respect to each other, which is the maximum angle of plasma incidence.

In view of the fact that Inconel and stainless steel are prone to galling (especially under vacuum conditions), and to minimize friction between sliding surfaces, the spools 38, washers 39 and 40, and nuts 41 are silver plated. The silver plating also enhances the electrical conduction between the plates 15 and the vessel wall 11 and/or 12. The studs 36 carry the mechanical loads on the plates 15 and the electrical currents flowing from the plate to the wall, and each has, for example, a minimum axial load capability of 300 lb. (135 kg).

For further detailed discussion of the stud loading, thermal analysis, stress analysis, etc., of the protective wall plate array of this invention, attention is directed to Report No. GA-A17192, Protective Interior Wall For The Doublet III Vacuum Vessel, R. D. Phelps et al, December 1983.

It has thus been shown that the present invention provides a protective inner wall for vacuum vessels, such as used in fusion reactors. The protective wall utilizes a series of small plates attached to the wall and installed so as to effectively conceal and protect the mounting hardware, while providing a substantial surface area that will absorb plasma energy. The invention also involves mounting hardware which ensures proper electrical grounding and physical anchoring of each of the protective plates, while allowing for distortion effects due to thermal expansion.

While a particular embodiment of the protective plates and mounting hardware therefor has been illustrated and described, modifications will become apparent to those skilled in the art, and it is intended to cover in the appended claims also such modifications as come within the scope of the invention.

What is claimed is:

1. A protective wall for the interior surface of a fusion reactor vessel wall comprising:
    an array of plates, each plate of said array including a main body section, a pair of edge sections bent at an angle with respect to said main body section, and a pair of flange-like end sections each having a plurality of protruding sections with cut-aways therein, said protruding sections of said flange-like end sections extending in a direction substantially parallel to said main body section; and
    means operatively associated with said protruding sections of said flange-like end sections of said plates for mounting said array of plates to an associated vessel wall to be protected.

2. The protective wall of claim 1, wherein said pair of flange-like end sections of each of said plates each have a first surface adjacent said main body sections which extends in a direction transverse to said main body section, and a second surface which extends in a direction substantially parallel to said main body section, said protruding sections extending from said second surface of said flange-like end sections.

3. The protective wall of claim 2, wherein said second surfaces of said pair of flange-like end sections extend in a direction towards one another, such that said cut-aways in said protruding sections of both of said flange-like end sections have openings extending in the same direction.

4. The protective wall of claim 2, wherein said main body section of each of said plates is substantially flat, wherein each of said edge sections has an outer end extending in a direction substantially perpendicular to said main body section, wherein said first surface of each of said flange-like end sections extends in a direction substantially perpendicular to said main body section, and wherein said second surface of each of said flange-like end sections extends in a direction substantially perpendicular to said first surface of said flange-like end surfaces, said second surfaces extending in a direction toward one another.

5. The protective wall of claim 1, wherein said edge sections of each of said plates are bent in a direction toward said protruding sections of said flange-like end section and at least partially conceal said cut-aways in said protruding sections when said plates are mounted on an associated vessel wall.

6. The protective wall of claim 1, wherein said mounting means for said array of plates includes a plurality of mounting hardware assemblies for each of said plates of said array, each of said mounting hardware assemblies including:
a stud adapted to be secured to an associated vessel wall,
a standoff having a central opening,
an apertured spool having at least an externally located groove adapted to cooperate with a cut-away of a protruding section of said flange-like end sections, and
washer means and nut.

7. The protective wall of claim 6, wherein said washer means consists of a clamping washer and a lock washer.

8. The protective wall of claim 6, wherein said spool additionally includes a centrally located outwardly projecting section adapted to cooperate with a cut-away of said protruding section of said flange-like end section of said plate.

9. In a vessel having a protective inner wall composed of a plurality of members, the improvement comprising means for fastening the protective inner wall to the vessel, said means comprising:
a stud having a threaded section and adapted to be secured to the vessel wall,
a standoff positioned around a portion of said stud for maintaining the protective inner wall in a spaced relation to the vessel,
a spool positioned around a portion of said stud and having an externally located groove and a centrally located protruding portion to which members of the protective inner wall are to be mounted,
a clamping washer for retaining an associated member of the protective inner wall against said spool, and
means for securing said standoff, spool and clamping washer on said stud.

10. The improvement of claim 9, wherein said last-mentioned means consists of a lock washer and a threaded nut adapted to be threaded onto said threaded section of said stud.

11. The improvement of claim 9, wherein said groove in said spool has a width wider than a thickness of an associated member of the protective inner wall such that the associated member is adapted to be loosely retained in said groove, while another member of the protective inner wall associated with said protruding portion of said spool is adapted to be tightly retained between said spool and said clamping washer.

12. In a vacuum vessel having a protective inner wall, on at least a portion of the interior of the vessel, the improvement comprising:
an array of rectangularly shaped plates mounted in spaced relation to the interior of the vessel forming a protective inner wall and constructed to substantially conceal means for fastening same to the vessel; and
means for fastening said array of plates to the interior of the vessel, said fastening means being constructed and arranged such that one part of each plate of said array of plates is loosely retained, while another part of that same plate is tightly retained.

13. The improvement of claim 12, wherein each of said rectangularly shaped plates comprises a main body section of a rectangular configuration, a pair of edge sections integral with and extending from longer sides of said main body section and at an angle thereto, and a pair of flange-like sections intergral with and extending from shorter sides of said main body section, said flange-like sections each having a portion thereof extending in a direction substantially parallel to said main body section and provided with attachment members to which said fastening means are connected.

14. The improvement of claim 13, wherein said portions of said flange-like sections have outer sections which extend in a direction towards one another.

15. The improvement of claim 14, wherein said attachment members each include a cut-away section adapted to cooperate with said fastening means, said cut-away sections in each of said flange-like sections having openings extending in the same direction.

16. The improvement of claim 15, wherein each of said pair of edge sections extends so as to at least partially conceal said attachment members.

17. The improvement of claim 12, wherein said fastening means includes a plurality of studs secured to the interior of the vessel, means for retaining said plates in spaced relation with respect to said vessel, means for loosely retaining one part of each of said plates, and means for tightly retaining another part of each of said plates.

18. The improvement of claim 17, wherein said last-two-mentioned means includes a spool and a clamping washer, said spool including an external groove and a projecting end portion, said one part of a plate being loosely retained in said groove, said another part of that same plate being tightly retained between said spool and said clamping washer.

19. The improvement of claim 18, wherein said one part and said another part of each of said plates includes an attachment member in each of said parts having a cut-away, said cut-away of said one part being located in said groove of said spool, and said cut-away of said other part being positioned around said projecting end portion of said spool.

20. The improvement of claim 12, wherein each of said rectangularly shaped plates is provided with four attachment means, and wherein said fastening means consists of four fastener structures, each fastener structure being constructed and arranged to cooperate with one of said attachment means of said plate.

* * * * *